United States Patent [19]

Goodman

[11] 4,451,143

[45] May 29, 1984

[54] COMBINATION DIRECT/REVERSE IMAGE COPY MACHINE

[75] Inventor: Joseph E. Goodman, Lawrenceville, Ga.

[73] Assignee: Jofax Industries, Inc., Norcross, Ga.

[21] Appl. No.: 367,154

[22] Filed: Apr. 12, 1982

[51] Int. Cl.³ ............................................. G03B 27/70
[52] U.S. Cl. ........................................ 355/66; 355/51
[58] Field of Search ............................. 355/51, 49, 66

[56] References Cited

U.S. PATENT DOCUMENTS

| | | |
|---|---|---|
| 2,940,358 | 6/1960 | Rosenthal . |
| 3,498,713 | 3/1970 | Schlegel et al. . |
| 3,982,833 | 9/1976 | Kolibas . |
| 4,033,691 | 7/1977 | Bierworth et al. ................... 355/51 |
| 4,040,733 | 8/1977 | Satomi ................................. 355/51 |
| 4,119,374 | 10/1978 | Mehl et al. . |
| 4,188,113 | 2/1980 | Hiraga .................................. 355/51 |
| 4,279,497 | 7/1981 | Satomi ................................. 355/51 |
| 4,380,390 | 4/1983 | Tateoka et al. ...................... 355/51 |

*Primary Examiner*—Monroe H. Hayes
*Attorney, Agent, or Firm*—Louis T. Isaf

[57] ABSTRACT

A copy machine for producing both acceptable direct image copies and acceptable reverse image copies in a single machine from the same original object, comprises two independently contained, optical element assemblies mounted side by side and movable selectively into and out of a coping position, and strategically placed light baffling and light blocking devices, all of which combine to overcome the prior art problems of poor focus, poor clarity and poor light distribution.

9 Claims, 7 Drawing Figures

COMBINATION DIRECT/REVERSE IMAGE COPY MACHINE

FIELD OF THE INVENTION

The present invention relates generally to the field of photocopy machines and more specifically to copy machines which perform the selectable function of producing both direct (right-reading) copies and reverse image copies from a single machine.

BACKGROUND OF THE INVENTION

Photocopy machines are a well established and even indispensable piece of equipment in today's society. Most prevelent in the market place today are what we will term direct or right-reading copy machines, being those machines which produce a copy which is readable in the same manner as the original document. Increasing demand has been made for copy machines which produce a reverse copy, a reverse copy being a copy on which the image is backward; that is, if a viewer were to view the copy through the backside of the paper, the image would appear right-way-round (right-reading).

Industry has responded to this request for reverse image copy machines by manufacturing numerous machines which perform only the function of producing reverse image copies. These reverse image copy machines are generally sold as a separate machine, and, therefore, each user is required to purchase two machines, one a direct image copy machine and the second a reverse image copy machine. Attempts have been made to develope and manufacture a single machine incorporating the dual functions of producing, at the discretion of the user, both a direct image copy and a reverse image copy. An example of such a dual function apparatus is seen in U.S. Pat. No. 4,119,374, Mehl et. al.

The prior art, dual functioning machines, including the above mentioned Mehl apparatus, have encountered numerous problems. For example, often times the direct image copy is produced with good clarity and light balance, whereas the reverse image copy will be out of focus, unclear, or lacking uniform light distribution. Prior to the present invention, efficient duel functioning machines have eluded even the giants of the photocopy industry. An apparatus has been needed which lessens the problems associated with the prior art machinery and produces both acceptable direct image copies and acceptable reverse image copies.

SUMMARY OF THE INVENTION

Briefly described, the present invention comprises a photocopy apparatus including two, independently contained, optical element assemblies mounted side by side within a copy machine frame. The two optical element assemblies are mounted side by side on a track in such a manner as to allow each assembly to be moved in and out of a copy producing position. The invention includes a copy machine frame of a type typical in the industry which defines within the frame an image path between an object holding glass and a focusing glass. In accordance with the present invention, the two independantly contained optical element assemblies are selectively, and alternately, movable into and out of the image path to the copy producing position, which position is oriented along the length of the image path such that each optical element assembly creates a real image of the object at the focusing glass.

The invention further includes light baffling and light blocking devices stategically placed within the image path so as to cooperate with the light source of the copy machine, and one or both optical element assemblies to create acceptable copies, irregardless of which optical element assembly is moved into the copy producing position. One of the optical element assemblies includes optical elements necessary to create a real, inverted image at the copy point which results in a right-reading copy. The other optical element assembly includes the optical elements necessary to create a real, uninverted image at the copy point which results in a reverse image copy.

It is, therefore, an object of the present invention to provide a photocopy apparatus which can produce both acceptable direct image copies and acceptable reverse image copies, in a single machine, from the same original object.

Another object of the present invention is to provide a copy machine which improves upon the prior art to provide a quick and easy method of producing both direct image and reverse image copies from a single machine.

Other objects, features and advantages of the present invention will become apparent upon reading the following specification, when taken in conjunction with the accompanying drawings.

DETAILED DESCRIPTION OF THE PREFERRED EMBODIMENT

Figure 1:
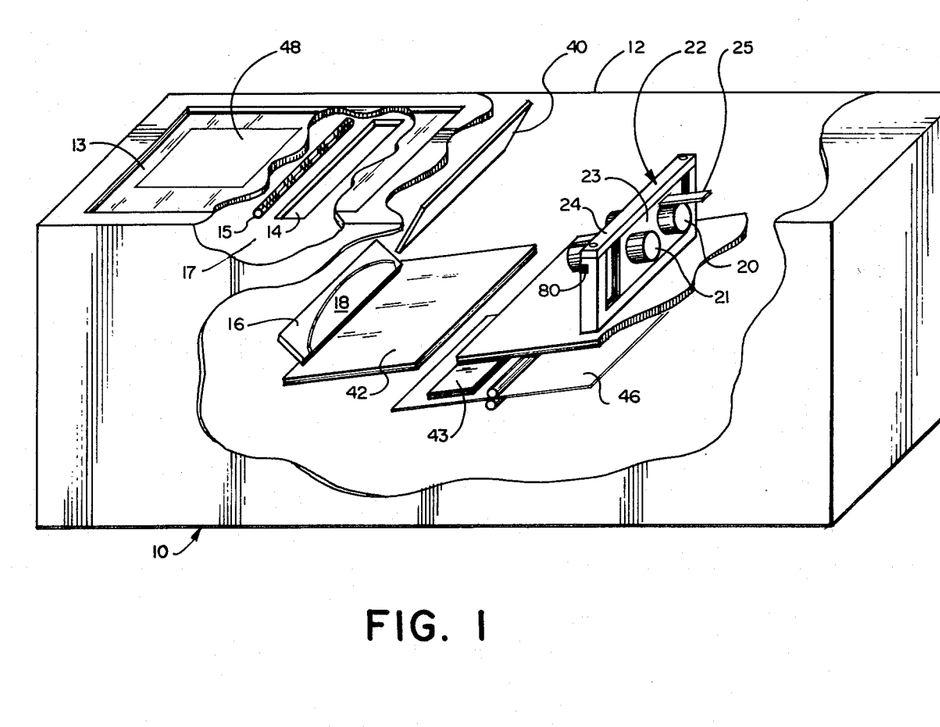
FIG. 1 is a pictorial representation of the combination direct image/reverse image copy machine in accordance with the present invention, with certain portions cut-away for clarity.

Referring now in greater detail to the drawings in which like numerals represent like components throughout several views, FIG. 1 shows a pictorial representation of certain isolated components of the combination direct image/reverse image copy machine 10 in accordance with the present invention. The copy machine 10 comprises a machine frame 12 including all of the mechanical and electrical parts typical of a copy machine presently known in the art together with the components added in accordance with the present invention. Components of particular interest to the present invention are depicted in FIG. 1 and include a transparent object holding plate 13 located along the top side of the machine frame 12 and movable in a horizontal plane along the frame. A lamp member 15 is located in a cavity 17 below the object holding plate 13, which cavity is open at its top to expose the object holding plate. At the base of the cavity 17 is an object viewing window 14. A first mirror 16 is located below the object viewing window 14 oriented in a plane forming an angle with the horizontal and in such a position that the object holding plate can be viewed from the mirror through the viewing window. A generally arc shaped baffle 18 is mounted adjacent the first mirror 16 at the base of the mirror, the baffle being generally in the form of a flat, circle segment defining a plane forming an angle with the plane of the first mirror. Horizontally removed from the first mirror 16 are mounted two optical element assemblies 20, 21. The two optical element assemblies are mounted side by side on a sliding plate 23 which plate slides within a track frame 24. A handle 25 is provided on the sliding plate 23 to assist in moving the plate 23 back and forth along the track frame 24.

One optical element assembly 20, also hereinafter referred to as the direct image optical element assembly 20, comprises a converging lens element 28 and a mirror element 29. The mirror element and lens element 28 are mounted stationary relative to one another within a casing 30 (see FIG. 3). The casing is threaded into the sliding plate 23. The second optical element assembly 21, hereinafter also referred to as the reverse image optical element assembly 21, comprises a second converging lens element 33 and a prism element 34. The second lens element 33 and prism element 34 are mounted stationary relative to one another within a casing 35. The casing 35 is threaded into the sliding plate 23.

Figure 3:
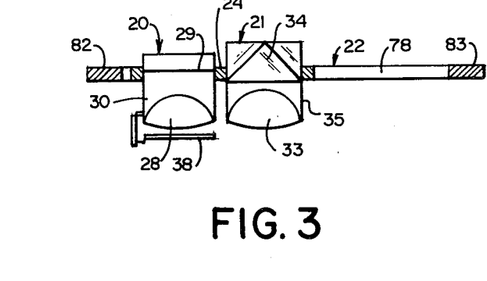
FIG. 3 is a top view of the optical element assemblies mounted in the tract assembly in accordance with the embodiment of FIG. 1, and seen along line 3—3 of FIG. 4.

The lens elements 28, 33 shown in FIG. 3 are shown as single lens elements. However, the present invention is not to be limited by the particular construction of the lens elements as it is recognized that, in actually, several combinations of elements having different indicies of refraction and dispersion may be used in order to reduce various aberrations, or for other purposes. That is, any catadioptic system which combines lens elements 28 and a mirror element 29 held stationary within a casing 30 will suffice as the optical element assembly 20, so long as the catadioptic system accomplishes the functions described herein. Likewise, any catadioptic system of lens elements 33 and prism element 34 held stationary within a casing 35 is acceptable, so long as it accomplishes the functions described herein.

Figure 4:
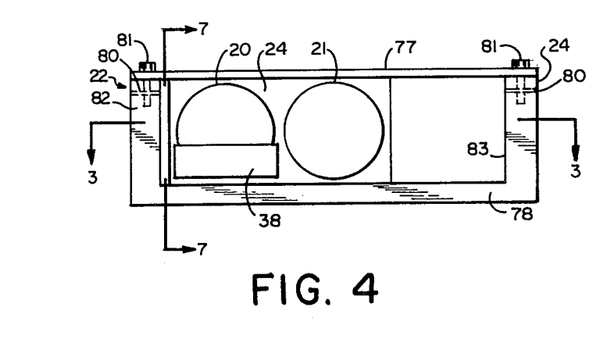
FIG. 4 is a front view of the optical element assemblies mounted in the tract assembly in accordance with the present invention.

Horizontally removed from the dual mounted optical element assemblies 20 and 21 is a second mirror 40 which again is mounted at an angle to the horizontal. Below the second mirror 40 is a copy viewing window 42. Below the window 42 is a focusing glass 43. The second mirror 40, copy viewing window 42 and focusing glass 43 are arranged in alignment such that a real image cast from the optical element assemblies 20, 21 will be reflected through the copy viewing window 42 to the focusing glass 43. As seen in FIG. 3 and FIG. 4, a light blocking element 38 is located immediately adjacent to and in front of the lens element 28 of the direct image optical element assembly 20.

The path defined from the object holding plate 13 through the object viewing window 14 to the first mirror 16, to the optical element assemblies 20, 21, to the second mirror 40, through the copy viewing window 42 to the focusing glass 43 shall be referred to as the image path. The design of the image path is a matter of design choice limited by the laws of optics.

Figure 2:
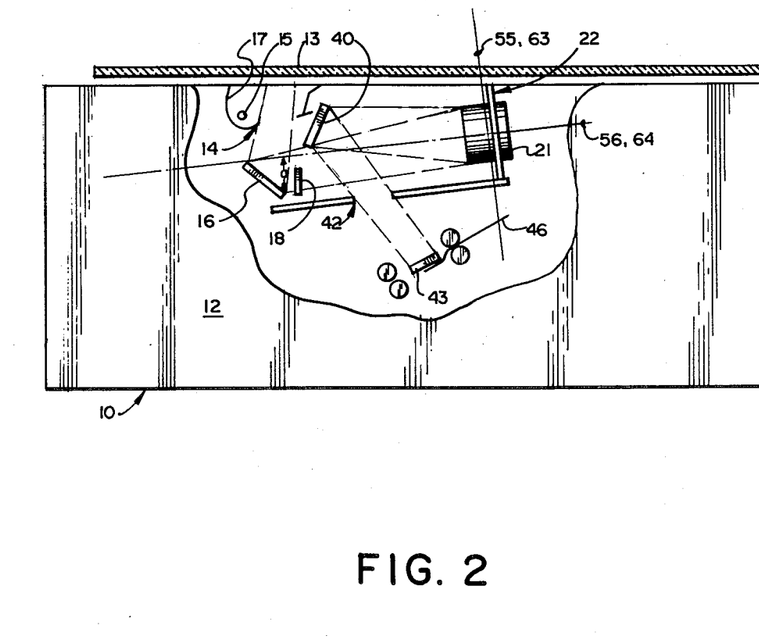
FIG. 2 is a side view of the copy machine of FIG. 1 with certain parts cut-away for clarity.

In the preferred embodiment of the present invention, as seen in FIG. 2, the optic axies (shown as a single axis marked 56, 64) of both optical element assemblies 20, 21 lie in the same plane. The optic axes 56,64 of the preferred embodiment defines a slight angle with the horizontal. The angle that the optic axies 56,64 form with the horizontal will vary with design of the image path. The first mirror 16 is positioned entirely below the optic axies 56,64, while the second mirror 40 is positioned entirely above the optic axies. Furthermore, the principal planes (shown as a single line marked 55,63 in FIG. 2) of both optical element assemblies 20, 21 are shown as lying in the same plane, although the locations of the principal planes, in some embodiments, vary greatly depending on the catadioptic systems 20, 21 used.

An example of an apparatus constructed in accordance with the preferred embodiment of the present invention is an apparatus as described above and defined by the following specifications:

the direct image optical element assembly 20 comprises a 150 mm, in mirror lens assembly such as the "HEXANON FX" 150 mm f/4.5 in mirror lens by Konishiroku including four (4) optic elements, three (3) of which make up the converging lens element 28 and one of which is the mirror element 29. The reverse image optical element assembly comprises a 150 mm, in prism lens assembly such as the "HEXANON FX" 150 mm f/4.3 in prism lens by Konishiroku including five (5) optic elements, four (4) of which make up the second converging lens element 33 and one of which is the prism element 34. The actual object to principal plane distance, due to the make up of the assemblies 20, 21 used, is approximately 286 mm for the mirror lens assembly and 291 mm for the prism lens assembly. The lamp member 15 comprises a 100 v/1250 w AC, horizontal, tungston halogen lamp of tube length 13 ⅛" having five filament segments as seen in FIG. 1. The two lamp filament segments at the edges are twice as long (1 inch) as the three inner filaments segments (½ inch). The first mirror 16 is eight (8) inches long. The baffle 18 is seven (7) inches long and placed at the base of the first mirror 16 at a distance of 35 mm from the first mirror and 128 mm from the object holding plate 13. The baffle 18 is approximately arcuate in shape with its highest point being approximately ⅝ of the effective height "a" of the first mirror 16 (as viewed from the optical element assemblies). One-half inch on each side of the first mirror is left unbaffled by the baffle 18. The light blocking element 38 is rectangular in shape extending across the width of the direct image optical element assembly 20 and extending upward covering the bottom two-fifths (forty percent [40%]) of the lens element 28. The blocking element 38 is positioned as close as possible to the lens element 28, even to the point of touching the lens element.

Although the preferred embodiment includes a baffle 18 of the shape and position described above, it is noted that the geometry and location of the baffle in other embodiments of this invention will vary for different catadioptic systems of the direct image optical element assembly 20 and the reverse image optical element assembly 21 employed by the user. The proper geometry and location of the baffle for different catadioptic systems is that geometry and location which delivers approximately uniform irradiance to the focusing glass 43. In determining the location and geometry of the baffle 18, the following principles are suggested as aids: preferably, the baffle 18 is coordinated with the least radiometrically efficient of the two optical element assemblies 20, 21, to provide for approximately uniform irradiance at the focusing glass 43 while that optical element assembly is in the copying position. In the disclosed embodiment, the baffle 18 is coordinated with the reverse image optical element assembly 21. Factors will affect the geometry and location of the baffle 18 include, but are not limited to, the irradiation pattern provided by the light source 15 and the degree of vignetting experienced by the optical element assembly 21. If, for example, the particular optical element assembly 21 used experiences a great deal of vignetting resulting in darkness at the edges of the copy, more light must be allowed past the edges of the baffle 18. If the lamp emits too little light at the center, the baffle is shortened in height. Once the particular dimensions of the baffle 18 are determined to properly effect the irradiance pattern desired, the user moves the baffle toward and away from the optical element assembly 21, shrinking the relative scale as the assembly is approached or increasing the relative scale as the baffle is moved away from the assembly, until a desired location is found to give desired performance.

Whereas the light blocking element 38 of the preferred embodiment is preferably of the geometry and location defined in accordance with the preferred embodiment above, the exact geometry and location of the blocking element in other embodiments will vary for different catadioptic systems of the optical element assemblies 20, 21. In determining the location and geometry of the light blocking element 38, the following principles are suggested as aids: preferably, the light blocking element 38 is associated with the most radiometrically efficient of the two optical element assemblies 20, 21. That is, whereas the baffle 18 affects light entering both assemblies 20, 21, the light blocking element 38 preferrably affects light entering the most radiometrically efficient optical element assembly only. In the disclosed embodiment the light blocking element 38 is associated with the direct image optical element assembly 20. Once the baffle 18 has been properly matched to the reverse image optical element assembly 21 (as mentioned above), the light blocking element 38 is coordinated with the direct image optical element assembly 20 to provide for desired irradiance at the focusing glass 43 when the assembly 20 is in the copying position. Factors which will affect the geometry and location of the blocking element 38 include, but are not limited to, the relative degrees of vignetting and the relative amounts of light absorption and internal reflection of the two optical element assemblies 20, 21. If, for example, too much light is allowed past the edges of the baffle 18 for desired performance of the direct image assembly 20, relative to the center, the blocking element 38 is made higher at the edges than in the middle (and visa versa). Once the proper shape is determined for acquiring desired uniformity of irradiance at the focusing glass 43, the height of the blocking element 38 is chosen to deliver the desired amount of irradiance (brightness) at the focusing glass. For example, if the image is too bright the blocking element is increased in height, and visa versa. If the irradiance is already uniform, but it is too bright, the blocking element 38 is a straight edge and varies in height based on the amount of light desired to be blocked to produce an acceptable copy. Once the particular dimensions of the blocking element 38 are chosen, the user moves the blocking element toward and away from the optical element assembly 20, increasing the relative scale as it is moved away from the assembly, until a desired location is found to give desired performance.

Figure 7:
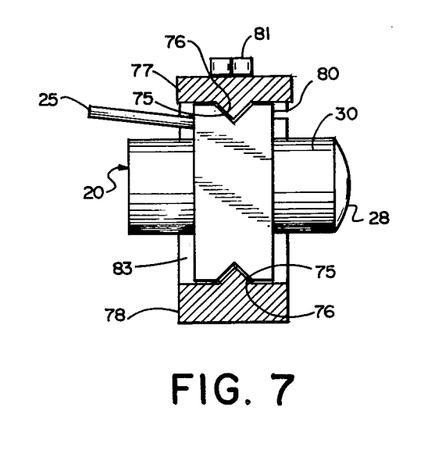
FIG. 7 is a cross-sectional side view of the track assembly in accordance with the preferred embodiment of the present invention, and seen along line 7—7 of FIG. 4.

The preferred embodiment of the present invention comprises a track assembly 22 for providing accurate alignment of each of the direct image optical element assembly 20 and reverse image optical element assembly 21, even in view of excessive movement of the respective optical element assembly into and out of the copying position. As previously described in relation to FIG. 1, the track assembly 22 includes a sliding plate 23 to which the optical element assemblies 20, 21 are mounted side by side. The sliding plate 23 moves within a track frame 24. As seen in FIG. 7, the sliding plate 23 has elongated "V" shaped beviled grooves 75 extending along the full length of the sliding plate at the top and bottom edges of the plate. These "V" shaped grooves 75 mate with "V" shaped ridges 76 extending along the length of the upper and lower cross-bars 77, 78 of the track frame 24. Elongated slots 80 are defined in the upper portions of the side members 82, 83 of the tract frame 24. In use, the sliding plate 23 is slid back and forth along the track frame 24 with the aid of handle 25. The matching "V" shaped grooves 75 and ridges 76 cooperate to retain the optical element assemblies in accurate alignment relative to the object holding plate 13, focusing glass 43 and mirrors 16, 40 along the image path. If, after extended use, the clearances become too great between the sliding member 23 and the track frame 24, the screws 81 can be tightened to collapse the side members 82, 83 along the slots 80, thus pressing the upper cross bar 77 against the sliding plate 23 forcing the sliding plate into the lower cross-bar 78 to lessen the clearance and remove the "play" between the track frame and sliding plate.

In operation, the apparatus of the present invention functions to selectively produce on copy paper 46 passing under the focusing glass 43 either a right-reading photocopy or a reverse image photocopy. An original object 48, such as a sheet of paper bearing a design, is placed on the transparent object holding plate 13. The lamp member 15 illuminates the object 48 from below the transparent holding plate 13. The operator moves the handle 25 to one side or the other to place either the direct image optical element assembly 20 or reverse image optical element assembly 21 in a coying position. The transparent plate 13 is moved horizontally over the top of the object viewing window 14 and as it passes over the window 14, portions of the illuminated object 48 are viewed from below through the object viewing window. The light rays from the illuminated object 48 travel along a path from the object viewing window 14 to the first mirror 16 at which point the rays are reflected in the direction of the dual mounted optical element assemblies 20, 21. With the sliding plate 23 in the position shown on FIG. 3, the copying position, the rays from the original object 48 are collected by the second converging lens element 33 and directed toward the prism 34 which prism inverts the rays and returns them through the lens 33 along a path to mirror 40 at which the rays are reflected through copy viewing window 42 onto copypaper 46 passing under the focusing glass 43.

With the reverse image optical element assembly 21 placed in the copying position, as in FIG. 3, an uninverted, real image is produced at the focusing glass 43 such that, when the image is produced on the copy paper 46, the copy appears as a reverse copy of the original object. When the direct image optical element assembly 20 is moved into the copying position (slid to the right as viewed in FIG. 3) an inverted, real image is projected at the focusing glass 43 such that an image produced on copy paper 46 at the focusing glass appears as a right-reading (right-way-round) copy.

Figure 5:
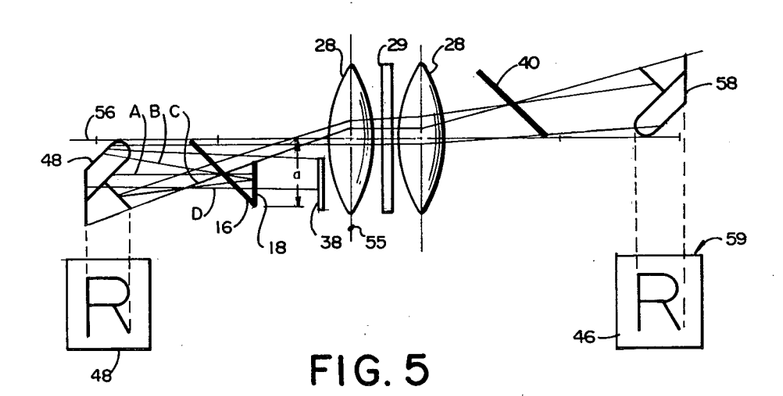
FIG. 5 is a ray diagram representing the operation of the present invention and depicting the direct image optical element assembly in the copying position.
Figure 6:
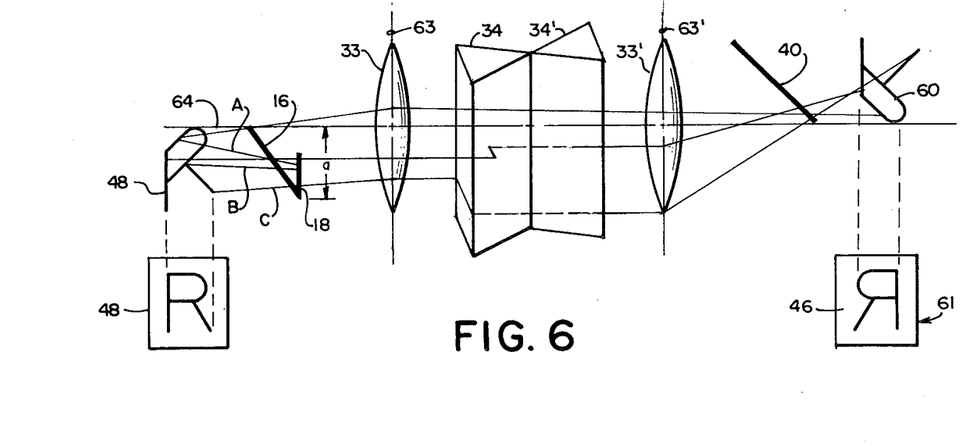
FIG. 6 is a ray diagram representing the operation of the preferred embodiment of the present invention, depicting the reverse image optical element assembly in the copying position.

Ray diagrams showing the operation of the preferred embodiment of the present invention are seen in FIGS. 5 and 6. These ray diagrams are an attempt to show generally the function of the various components of the present invention and should not be reviewed for optical accuracy. FIG. 5 shows the principal-ray diagram resulting from placement of the direct image optical element assembly 20 into the copying position. The path of the rays (the image path) has been "unfolded" for ease of description. FIG. 5 shows the direct image optical element assembly 20 in a representative form in which the lens element 28 has been shown twice in order to show the practical effect of the light rays going first through the lens 28 then hitting the mirror 29 and returning again through the lens 28. In reality, there would be but one lens element 28 (although comprised of more than one optic element as described in the example above) and the rays entering from the left side of FIG. 2 would return back to the left. For purposes of this example, the object 48 shown in FIG. 5 is held at approximately twice the focal length of the optical element assembly 20, which approximates the focal length of the lens element 28. Likewise, the image 58 at the focusing glass 43 is shown located approximately at twice the focal length of the optical element assembly 20. The first mirror 16 is shown lying below the optic axis 56 of the lens element 28, while the second mirror 40 lies above the optic axis 56. The baffle 18 is positioned immediately adjacent the base of first mirror 16 extending two-thirds the effective height "a" of the mirror 16 (see the example above). The light blocking element 38 is positioned immediately adjacent the outer edge of the lens element 28 covering the lower two-fifths portion of the lens element (see the example above). Representative rays have been drawn from the original object through the optical element assembly 20 to demonstrate the creation of a real, inverted image 58 at the focusing glass 43 resulting in a right-reading copy 59 on paper. It will be noted that, only those rays which strike the mirror 16 actually reach the lens element 28. Certain of the rays, for example rays A and B of FIG. 5 are prevented from reaching the lens element 28 because they are obstructed by the baffle 18. However, since the baffle 18 of the preferred embodiment is constructed in an arcuate shape and, also, since the outer extremes of the first mirror 16 are not covered by the baffle, certain of the rays stiking mirror 16 at its outer extremes, such as rays C and D of FIG. 5, will avoid the baffle by passing over the baffle at a portion where the arc has diminished to a lower height or by passing next to the baffle. Certain of the rays which avoid the baffle 18 are prevented from reaching the lens element 28 by the blocking element 38, see for example ray D. Those rays which are not reflected by the mirror 16 and also those rays which are obstructed by the baffle 18 or the blocking element 38 play no role in the makeup of the real image 58. Therefore, the mirror 16, baffle 18 and blocking element 38 each play a role in determining the irradiance delivered to the copy paper 46 during the formation of the real image 58.

FIG. 6 is a ray diagram representation of the formation of a real, uninverted image 60 which, when projected onto copy paper 46 at the focusing glass 43 results in a reverse image copy 61. For ease of explanation, the optical system of the copy machine 10 seen in FIGS. 1 and 2 has been "unfolded" in FIG. 6. The reverse image optical element assembly 21 which in reality consist of a lens element 33 and a prism element 34 has been represented in FIG. 6 by two lens elements 33, 33' and two prism elements 34, 34' to more easily illustrate the action of the rays as they pass into the optical element assembly 21 through the lens element and are again returned by the prism through the same lens element. The prism 34, in the preferred embodiment is positioned relative to the lens element 33 and image path such that the profile from the top view appears as seen in FIG. 3. Therefore, the prism 34 is drawn in three dimension in FIG. 6 to give an accurate example of the ray paths. FIG. 6 shows the first mirror 16 positioned below the optic axis 64 of the lens element 33. The second mirror 40 is positioned above the optic access 64. The arcuate baffle 18 is positioned immediately adjacent the base of the first mirror 16 extending two-thirds the effective height "a" of that mirror (see the example above). Again, this example shows the object 48 positioned at approximately twice the focal length of the optical element assembly 21, which approximates the focal length of the lens element 33.

The baffle 18 functions as described above in the description of FIG. 5. Certain rays departing from the original object 48 strike the baffle 18 and are prevented from reaching the lens element 33, see for example rays A and B. Certain rays, such as ray C, although they would appear to be obstructed by baffle 18, avoid the baffle and proceed to incidence with the lens element 33. This is due to the fact that, as seen in FIG. 1, the baffle 18 is arcuate in shape and, therefore, the height of the baffle lessens as the outer edges of the baffle and thus the mirror are approached; also, as explained, the baffle does not extend to the outer extremes of the mirror 16. Therefore, rays striking the mirror further away from its center, have a greater chance of avoiding the baffle 18 than do rays striking the mirror at its center. Only rays which strike the mirror will eventually have a chance of being collected by the lens element 33. In this way, the mirror 16 and baffle 18 each affect the irradiance delivered at the focusing glass 43 during the formation of the image 60.

Whereas this invention has been described with particular reference to preferred embodiments thereof, it will be understood that variations and modifications can be effected within the spirit and scope of the invention as described herein before and as defined in the appended claims.

I claim:

1. A reprographic apparatus for making a photo copy of an original object, said apparatus comprising:
    an image path defined between the original object and the copy;
    a light source for illuminating said original object;
    a right reading optical element assembly movable into and out of said image path;

a reverse image optical element assembly movable into and out of said image path and interchangable with said right reading optical element assembly;

baffle means positioned within said image path in the upper focal length of the optical element assemblies, said baffle means cooperating with said light source and each of said right reading optical element assembly and said reverse image optical element assembly to deliver uniform irradiance at the copy; and light blocking means positioned in fixed relationship relative to and movable with said right reading optical element assembly for reducing the amount of light entering said right reading optical element assembly.

2. A reprographic apparatus for making a photo copy of an original object, said apparatus comprising:

an object plate for supporting an original object to be copied;

a copy plate displaced from said object plate;

an image path defined between said object plate and said copy plate;

a right reading optical element assembly movable into and out of said image path, said right reading optical element assembly comprising a first lens system and a mirror mounted to one side of said first lens system, said mirror and said first lens system being fixed relative to one another, whereby both said first lens system and said mirror move together, in fixed relationship, into and out of said image path;

reverse image optical element assembly maintained stationary relative to said right reading optical element assembly, movable into and out of said image path, said reverse image optical element assembly comprising a second lens system and a prism mounted to one side of said second lens system, said prism and second lens system being fixed relative to one another, whereby both said second lens system and said prism move together, in fixed relationship, into and out of said image path; and means for selectively and alternately moving said right reading optical element assembly and said reverse image optical element assembly into said image path, wherein movement of said right reading optical element assembly is restricted to movement within a single plane, and movement of said reverse image optical element assembly is restricted to movement within a single plane, and wherein each said optical element assembly when moved into said image path is automatically positioned such that an image of the original object produced at said copy plate by the respective optical element assembly is in focus.

3. Apparatus of claim 2, further comprising:

a first casing means associated with said first lens system and said mirror for preventing the passage of dust and other particles between said first lens system and said mirror; and a second casing means associated with said second lens system and said prism for preventing the passage of dust and other particles between said lens system and said prism.

4. Apparatus of claim 2 wherein said prism of said reverse image optical element assembly comprises a prism having total internal refraction.

5. A reprographic apparatus for making a photo copy of an original object, said apparatus comprising:

an object plate for supporting an original object to be copied;

a copy plate displaced from said object plate;

an image path defined between said object plate and said copy plate;

a right reading optical element assembly movable into and out of said image path, said right reading optical element assembly comprising a first lens system and a mirror mounted to one side of said first lens system, said mirror and said first lens system being fixed relative to one another, whereby both said first lens system and said mirror move together, in fixed relationship, into and out of said image path;

a reverse image optical element assembly movable into and out of said image path, and interchangable with said right reading lens assembly, said reverse image optical element assembly comprising a second lens system and a prism mounted to one side of said second lens system, said prism and second lens system being fixed relative to one another, whereby both said second lens system and said prism move together, in fixed relationship, into and out of said image path;

means for selectively and alternately moving said right reading optical element assembly and said reverse image optical element assembly into said image path;

light source for illuminating an object on said object plate;

baffle means positioned in said image path for delivering, in cooperation with said light source and each of said right-reading optical element assembly and said reverse image optical element assembly, a uniform irradiance at said copy plate; and light blocking means associated with and movable with said right-reading optical element assembly for reducing the amount of light entering said right-reading optical element assembly.

6. A reprographic apparatus for making, alternately, both right-reading and reverse image copies of an original object, said apparatus comprising:

an object plate for supporting an original object to be copied;

a copy plate displaced from said object plate;

an image path defined between said object plate and said copy plate;

a sliding plate movable along a track within a first plane oriented at an angle perpendicular to the length of said image path, movement of said sliding plate being restricted to movement within said first plane;

a right-reading optical element assembly rigidly mounted to said sliding plate, said right reading optical element assembly comprising a first lens system and a mirror mounted to one side of said first lens system, said mirror and said lens system being fixed relative to one another within a casing;

a reverse image optical element assembly rigidly mounted to said sliding plate adjacent said right-reading optical element assembly and stationary relative to said right reading optical element assembly, said reverse image optical element assembly comprising a second lens system and a prism mounted to one side of said second lens system, said prism and said second lens system being fixed relative to one another within a casing;

means for selectively moving said sliding plate within said track to alternately place said right-reading optical element assembly and said reverse image optical element assembly into copy positions within said image path, wherein each said optical element assembly when moved into its respective copy position is automatically positioned such that an image of the original object produced at said copy plate by the respective optical element assembly is in focus;

light source for illuminating an object on said object plate;

baffle element positioned stationary in the image path between said object plate and said first plane, said baffle element being of a geometry and location determined in cooperation with said reverse image optical element assembly to deliver approximately uniform irradiance and desired light intensity at said copy plate when said reverse image optical element assembly is in its respective copy position and the object is illuminated on said object plate; and light blocking element fixed relative to said right-reading optical element assembly and movable with said sliding plate, said light blocking element being of a geometry and location determined in cooperation with said baffle element and said right-reading optical element assembly to deliver approximately uniform irradiance and desired light intensity at said copy plate when said right-reading optical element assembly is in the copy position and the object is illuminated on said object plate, said light blocking element having no light affecting association with said reverse image optical element assembly.

7. Apparatus of claim 6, wherein said first plane within which said sliding plate moves is oriented perpendicular to the length of said image path.

8. A method for making, alternately, both right-reading and reverse image copies on material at a copy plate of an original object positioned on an object plate, said method comprising the steps of:

defining an image path between the object plate and the copy plate;

placing a prism/lens assembly in the image path at a copy position where the image of the object produced by the prism/lens assembly at the copy plate is in focus;

placing a baffle element in the image path between the object plate and prism/lens assembly;

shaping the baffle element and locating the baffle element within the image path such that the baffle element, in cooperation with the prism/lens assembly, effects approximately uniform irradiance and desired light intensity at the copy plate when the object plate is illuminated;

rigidly fixing the baffle element of above determined shape and location in the image path;

removing the prism/lens assembly from the image path and placing a mirror/lens assembly in the image path between the fixed baffle element and the copy plate at a copy position where the image of the object produced at the copy plate by the mirror/lens assembly is in focus;

placing a light blocking element in the image path between the baffle element and the mirror/lens assembly;

shaping the light blocking element and locating the light blocking element relative to the mirror/lens assembly such that the light blocking element, in cooperation with the baffle element and the mirror/lens assembly, effect approximately uniform irradiance and desired light intensity at the copy plate when the object plate is illuminated;

rigidly fixing the light blocking element stationary relative to and movable with the mirror/lens assembly to form a mirror/lens/blocking element assembly;

illuminating the object plate with an object positioned thereon and the mirror/lens/blocking element assembly in its respective copy position, to make a right-reading copy on material positioned at the copy plate;

removing the mirror/lens/blocking element assembly and replacing the prism/lens assembly into its respective copy position; and illuminating the object plate with an object positioned thereon and the prism/lens assembly in its respective copy position, to make a reverse image copy on material positioned at the copy plate.

9. Method of claim 8, further comprising the steps of:

fixedly mounting the prism/lens assembly to a sliding plate;

fixedly mounting the mirror/lens assembly and the light blocking element to the sliding plate; maintaining the prism/lens assembly and mirror/lens assembly stationary relative to one another;

moving the sliding plate back and forth across the image path, along a single plane of movement to alternately place the prism/lens assembly and the mirror/lens assembly in their respective copy positions.

* * * * *